United States Patent
Lai et al.

(10) Patent No.: US 12,477,118 B2
(45) Date of Patent: Nov. 18, 2025

(54) METHOD AND APPARATUS USING AFFINE NON-ADJACENT CANDIDATES FOR VIDEO CODING

(71) Applicant: MEDIATEK INC., Hsinchu (TW)

(72) Inventors: Chen-Yen Lai, Hsinchu (TW);
Tzu-Der Chuang, Hsinchu (TW);
Ching-Yeh Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 177 days.

(21) Appl. No.: 18/064,434

(22) Filed: Dec. 12, 2022

(65) Prior Publication Data

US 2023/0232012 A1 Jul. 20, 2023

Related U.S. Application Data

(60) Provisional application No. 63/299,522, filed on Jan. 14, 2022.

(51) Int. Cl.
*H04N 19/137* (2014.01)
*H04N 19/105* (2014.01)
*H04N 19/176* (2014.01)

(52) U.S. Cl.
CPC ......... *H04N 19/137* (2014.11); *H04N 19/105* (2014.11); *H04N 19/176* (2014.11)

(58) Field of Classification Search
CPC .................................................. H04N 19/137
See application file for complete search history.

(56) References Cited

U.S. PATENT DOCUMENTS 10,778,999 B2\* 9/2020 Li ........................ H04N 19/70
10,841,609 B1\* 11/2020 Liu ....................... H04N 19/52
(Continued)

FOREIGN PATENT DOCUMENTS

CN 113439444 A 9/2021
TW 202046731 A 12/2020

OTHER PUBLICATIONS

Chinese language office action dated Sep. 15, 2023, issued in application No. TW 112101502.
(Continued)

*Primary Examiner* — Irfan Habib
(74) *Attorney, Agent, or Firm* — McClure, Qualey & Rodack, LLP (57) ABSTRACT

Methods and apparatus for video coding using non-adjacent affine candidates are provided. According to this method, one or more neighboring MVs (motion vectors) are determined from one or more non-adjacent affine-coded neighbors of the current block. CPMVs (Control-Point Motion Vectors) are determined based on said one or more neighboring MVs, wherein if a target neighboring block associated with one target neighboring MV (Motion Vector) is outside an available region, a derived CPMV) is generated to replace the target neighboring MV. An affine merge list or an affine AMVP (Advanced Motion Vector Prediction) list having said one or more neighboring MVs as one non-adjacent affine candidate is generated, wherein said one non-adjacent affine candidate generates a non-adjacent affine predictor using motion information according to the CPMVs. The current block is encoded or decoded using a motion candidate selected from the affine merge list or the affine AMVP list.

13 Claims, 6 Drawing Sheets

(56) References Cited

U.S. PATENT DOCUMENTS

| | | | |
|---|---|---|---|
| 10,965,956 B2* | 3/2021 | Li | H04N 19/105 |
| 11,146,813 B2* | 10/2021 | Li | H04N 19/54 |
| 12,028,514 B2* | 7/2024 | Park | H04N 19/176 |
| 12,206,861 B2* | 1/2025 | Li | H04N 19/52 |
| 2017/0078698 A1* | 3/2017 | Park | H04N 19/105 |
| 2017/0332095 A1* | 11/2017 | Zou | H04N 19/44 |
| 2018/0098063 A1* | 4/2018 | Chen | H04N 19/139 |
| 2018/0192069 A1* | 7/2018 | Chen | H04N 19/176 |
| 2018/0270500 A1* | 9/2018 | Li | H04N 19/52 |
| 2019/0058896 A1* | 2/2019 | Huang | H04N 19/61 |
| 2019/0327482 A1* | 10/2019 | Lin | H04N 19/52 |
| 2019/0387250 A1* | 12/2019 | Boyce | H04N 19/52 |
| 2020/0029089 A1* | 1/2020 | Xu | H04N 19/52 |
| 2020/0036997 A1* | 1/2020 | Li | H04N 19/139 |
| 2020/0374549 A1* | 11/2020 | Li | H04N 19/517 |
| 2020/0382771 A1* | 12/2020 | Liu | H04N 19/139 |
| 2020/0396465 A1* | 12/2020 | Zhang | H04N 19/159 |
| 2021/0160528 A1* | 5/2021 | Chen | H04N 19/513 |
| 2021/0266589 A1* | 8/2021 | Chen | H04N 19/55 |
| 2021/0266591 A1* | 8/2021 | Zhang | H04N 19/52 |
| 2021/0352315 A1* | 11/2021 | Zhang | H04N 19/105 |
| 2022/0103827 A1* | 3/2022 | Liu | H04N 19/159 |
| 2022/0103829 A1* | 3/2022 | Deng | H04N 19/176 |
| 2022/0109870 A1* | 4/2022 | Jeong | H04N 19/139 |
| 2023/0291908 A1* | 9/2023 | Li | H04N 19/46 |
| 2023/0412794 A1* | 12/2023 | Li | H04N 19/52 |
| 2024/0314348 A1* | 9/2024 | Zhao | H04N 19/517 |
| 2024/0323353 A1* | 9/2024 | Zhang | H04N 19/52 |
| 2025/0016361 A1* | 1/2025 | Zhang | H04N 19/109 |

OTHER PUBLICATIONS

Chen, W., et al.; "AHG12: Non-adjacent spatial neighbors for affine merge mode;" Joint Video Experts Team (JVET) of ITU-T SG 16 WP 3 and ISO/IEC JTC 1/SC 29; Oct. 2021; pp. 1-4.

* cited by examiner

METHOD AND APPARATUS USING AFFINE NON-ADJACENT CANDIDATES FOR VIDEO CODING

CROSS REFERENCE TO RELATED APPLICATIONS

The present invention claims priority to U.S. Provisional Patent Application Ser. No. 63/299,522, filed on Jan. 14, 2022. The U.S. Provisional Patent Application is hereby incorporated by reference in its entirety.

FIELD OF THE INVENTION

The present invention relates to video coding using motion estimation and motion compensation. In particular, the present invention relates to complexity reduction for systems using the affine mode with non-adjacent candidates.

BACKGROUND AND RELATED ART

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

Figure 1A:
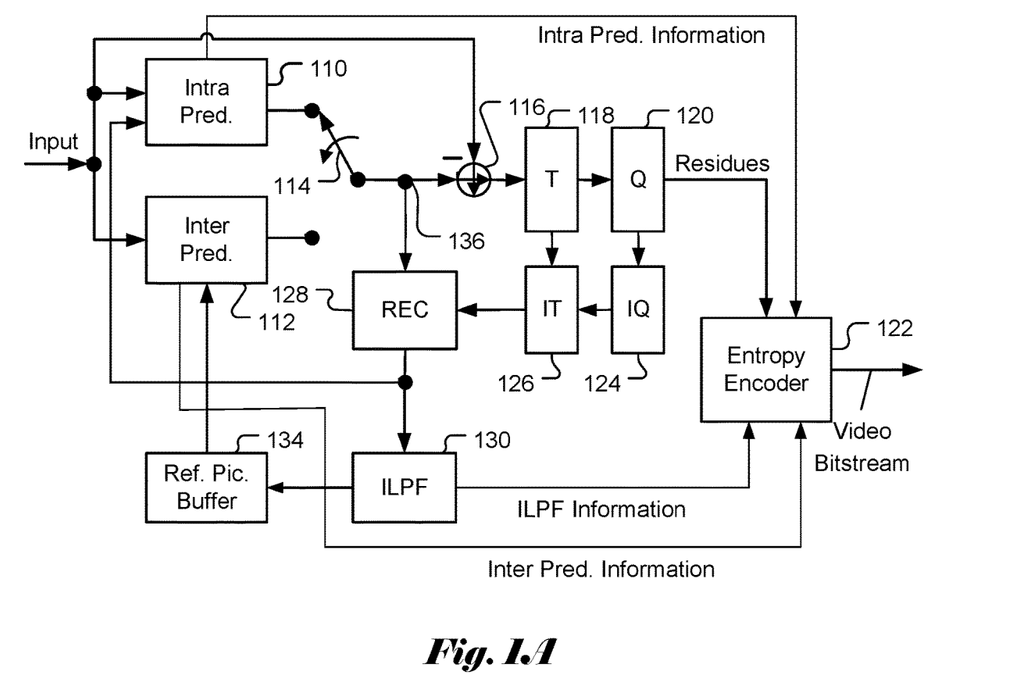
FIG. 1A illustrates an exemplary adaptive Inter/Intra video coding system incorporating loop processing.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

Figure 1B:
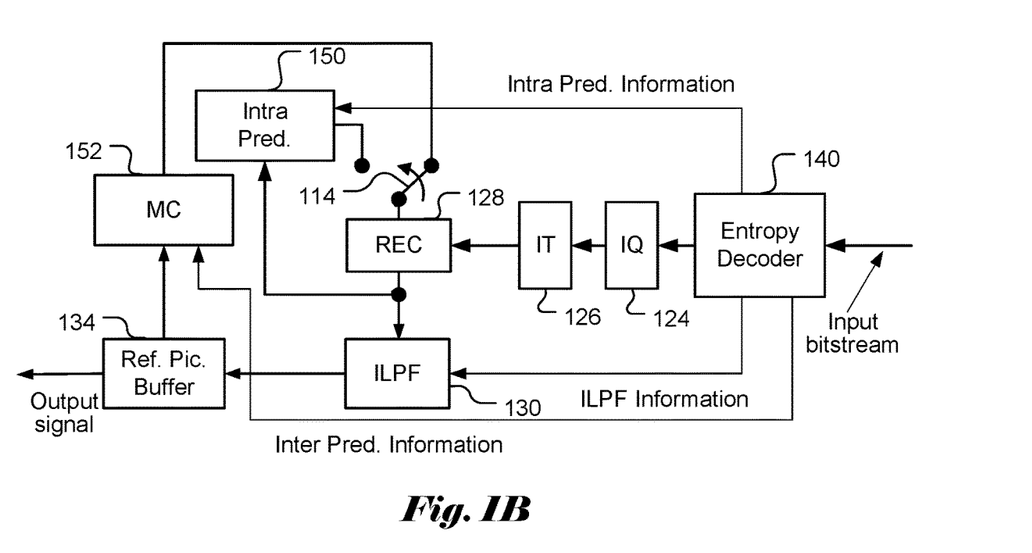
FIG. 1B illustrates a corresponding decoder for the encoder in FIG. 1A.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Among various new coding tools, some coding tools relevant to the present invention are reviewed as follows.

Affine Optical Flow

When the coding unit (CU) is coded with affine mode, the coding unit is partitioned into 4×4 subblocks and for each subblock, one motion vector is derived based on the affine model and motion compensation is performed to generate the corresponding predictors. The reason of using 4×4 block as one subblock, instead of using other smaller size, is to achieve a good trade-off between the computational complexity of motion compensation and coding efficiency. In order to improve the coding efficiency, several methods are disclosed in JVET-N0236 (J. Luo, et al., "CE2-related: Prediction refinement with optical flow for affine mode", Joint Video Experts Team (JVET) of ITU-T SG 16 WP 3 and ISO/IEC JTC 1/SC 29/WG 11, 14th Meeting: Geneva, CH, 19-27 Mar. 2019, Document: JVET-N0236), JVET-N0261 (K. Zhang, et al., "CE2-1.1: Interweaved Prediction for Affine Motion Compensation", Joint Video Experts Team (JVET) of ITU-T SG 16 WP 3 and ISO/IEC JTC 1/SC 29/WG 11, 14th Meeting: Geneva, CH, 19-27 Mar. 2019, Document: JVET-N0261), and JVET-N0262 (H. Huang, et al., "CE9-related: Disabling DMVR for non equal weight BPWA", Joint Video Experts Team (JVET) of ITU-T SG 16 WP 3 and ISO/IEC JTC 1/SC 29/WG 11, 14th Meeting: Geneva, CH, 19-27 Mar. 2019, Document: JVET-N0262).

In JVET-N0236, to achieve a finer granularity of motion compensation, the contribution proposes a method to refine the sub-block based affine motion compensated prediction with optical flow. After the sub-block based affine motion compensation is performed, luma prediction sample is refined by adding a difference derived by the optical flow equation. The proposed Prediction Refinement with Optical Flow (PROF) is described as the following four steps. Step 1), the sub-block-based affine motion compensation is performed to generate sub-block prediction I(i, j). Step 2), the spatial gradients $g_x(i, j)$ and $g_y(i, j)$ of the sub-block prediction are calculated at each sample location using a 3-tap filter [−1, 0, 1].

$g_x(i, j)=I(i+1, j)-I(i-1, j)$, and $g_y(i, j)=I(i, j+1)-I(i, j-1)$.

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided. Step 3), the luma prediction refinement is calculated by the optical flow equation.

Figure 2:
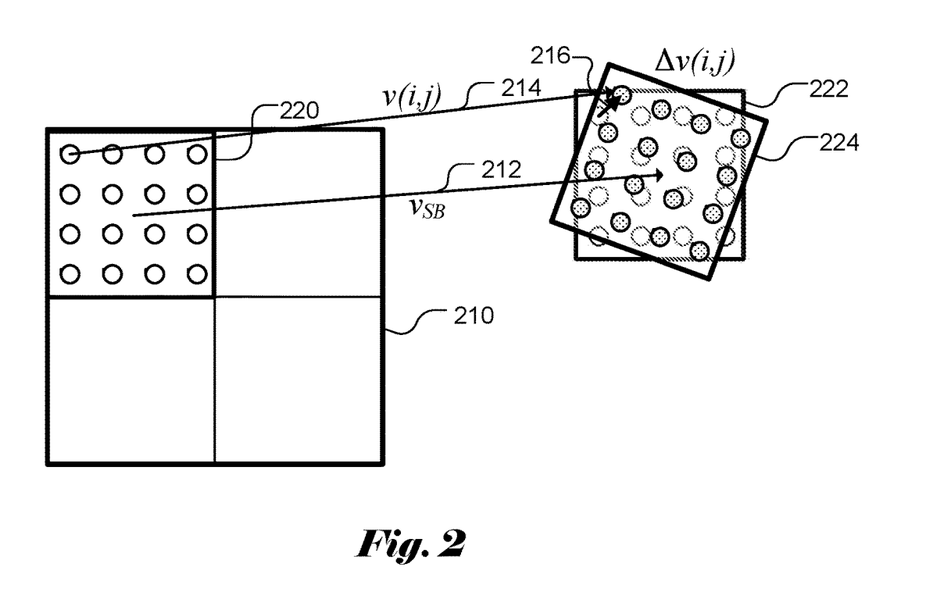
FIG. 2 illustrates an example of sub-block based affine motion compensation, where the motion vectors for individual pixels of a sub-block are derived according to motion vector refinement.

$\Delta I(i, j)=g_x(i, j)*\Delta v_x(i, j)+g_y(i, j)*\Delta v_y(i, j)$ where the $\Delta v(i, j)$ is the difference between pixel MV computed for sample location (i, j), denoted by v(i, j), and the sub-block MV, denoted as $v_{SB}$ (212), of the sub-block 220 of block 210 to which pixel (i, j) belongs, as shown in FIG. 2. In FIG. 2, sub-block 222 corresponds to a reference sub-block for sub-block 220 as pointed by the motion vector $v_{SB}$ (212). The reference sub-block 222 represents a reference sub-block resulted from translational motion of block 220. Reference sub-block 224 corresponds to a reference sub-block with PROF. The motion vector for each pixel is refined by $\Delta v(i, j)$. For example, the refined motion vector v(i, j) 214 for the top-left pixel of the sub-block 220 is derived based on the sub-block MV $v_{SB}$ (212) modified by $\Delta v(i, j)$ 216.

Since the affine model parameters and the pixel locations relative to the sub-block center are not changed from sub-block to sub-block, $\Delta v(i, j)$ can be calculated for the first sub-block, and reused for other sub-blocks in the same CU. Let x and y be the horizontal and vertical offset from the pixel location to the center of the sub-block, $\Delta v(x, y)$ can be derived by the following equation, $$\begin{cases} \Delta v_x(x, y) = c*x + d*y \\ \Delta v_y(x, y) = e*x + d*y \end{cases}.$$

For 4-parameter affine model, parameters c and e can be derived as:

$$\begin{cases} c = f = \frac{v_{1x} - v_{0x}}{w} \\ e = -d = \frac{v_{1y} - v_{0y}}{w} \end{cases}.$$

For 6-parameter affine model, parameters c, d, e and f can be derived as:

$$\begin{cases} c = \frac{v_{1x} - v_{0x}}{w} \\ d = \frac{v_{2x} - v_{0x}}{h} \\ e = \frac{v_{1y} - v_{0y}}{w} \\ f = \frac{v_{2y} - v_{0y}}{h} \end{cases}.$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU. Step 4), finally, the luma prediction refinement is added to the sub-block prediction I(i, j). The final prediction I' is generated as the following equation.

$I'(i, j)=I(i, j)+\Delta I(i, j)$.

Figure 3:
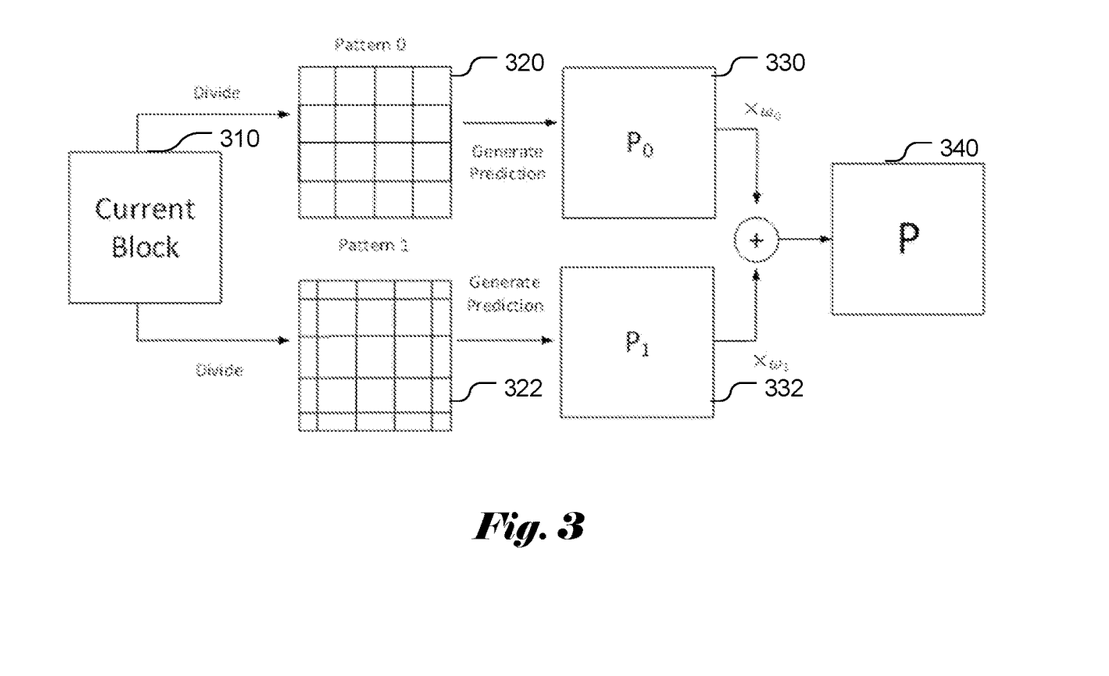
FIG. 3 illustrates an example of interweaved prediction, where a coding block is divided into sub-blocks with two different dividing patterns and then two auxiliary predictions are generated by affine motion compensation with the two dividing patterns.
Figure 4:
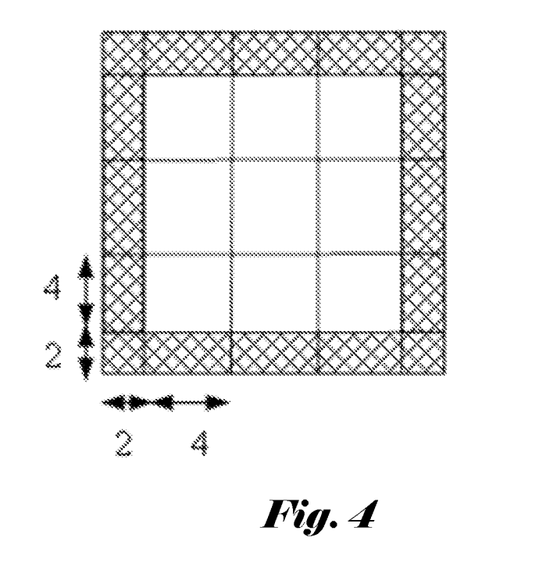
FIG. 4 illustrates an example of avoiding motion compensation with 2×H or W×2 block size for the interweaved prediction, where the interweaved prediction is only applied to regions with the size of sub-blocks being 4×4 for both the two dividing patterns.

In JVET-N0261, another sub-block based affine mode, interweaved prediction, was proposed in FIG. 3. With the interweaved prediction, a coding block 310 is divided into sub-blocks with two different dividing patterns (320 and 322). Then two auxiliary predictions ($P_0$ 330 and $P_1$ 332) are generated by affine motion compensation with the two dividing patterns. The final prediction 340 is calculated as a weighted-sum of the two auxiliary predictions (330 and 332). To avoid motion compensation with 2×H or W×2 block size, the interweaved prediction is only applied to regions where the size of sub-blocks is 4×4 for both the two dividing patterns as shown in FIG. 4.

According to the method disclosed in JVET-N0261, the 2×2 subblock based affine motion compensation is only applied to uni-prediction of luma samples and the 2×2 subblock motion field is only used for motion compensation. The storage of motion vector field for motion prediction etc., is still 4×4 subblock based. If the bandwidth constrain is applied, the 2×2 subblock based affine motion compensation is disabled when the affine motion parameters do not satisfy certain criterion.

In JVET-N0273 (H. Huang, et al., "CE9-related: Disabling DMVR for non equal weight BPWA", Joint Video Experts Team (WET) of ITU-T SG 16 WP 3 and ISO/IEC JTC 1/SC 29/WG 11, 14th Meeting: Geneva, CH, 19-27 Mar. 2019, Document: JVET-N0262), the 2×2 subblock based affine motion compensation is only applied to uni-prediction of luma samples and the 2×2 subblock motion field is only used for motion compensation. If bandwidth constrain is applied, the 2×2 subblock based affine motion compensation is disabled when the affine motion parameters don't satisfy certain criterion.

Affine Model

Motion occurs across pictures along temporal axis can be described by a number of different models. Assuming A(x, y) be the original pixel at location (x, y) under consideration, A' (x', y') be the corresponding pixel at location (x', y') in a reference picture for a current pixel A(x, y), the affine motion models are described as follows.

The affine model is capable of describing two-dimensional block rotations as well as two-dimensional deformations to transform a square (or rectangles) into a parallelogram. This model can be described as follows:

$x'=a_0+a_1*x+a_2*y$, and $y'=b_0+b_1*x+b_2*y$. (1)

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \overset{\Delta}{\Longrightarrow} \begin{cases} vx = (1-a)x - by - e \\ vy = (1-a)y + bx - f \end{cases} \quad (2)$$

Figure 5:
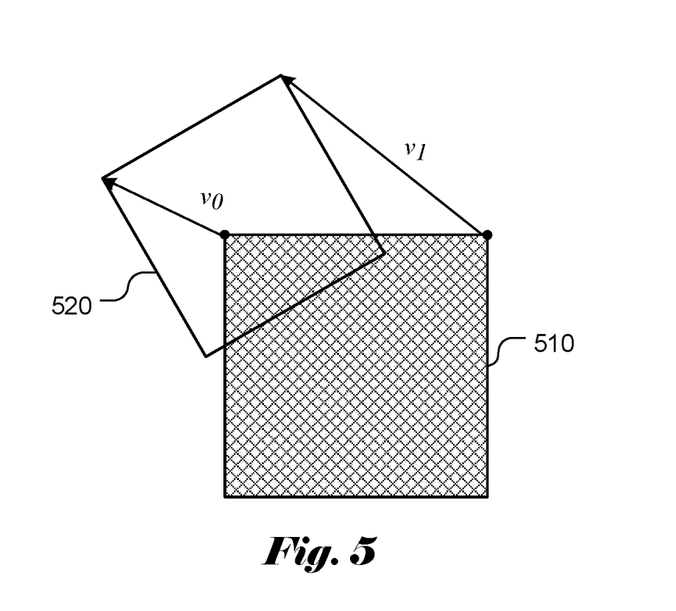
FIG. 5 illustrates an example of four-parameter affine model, where a current block a reference block is shown.

An example of the four-parameter affine model is shown in FIG. 5, where a corresponding reference block 520 for the current block 510 is located according to an affine model with two control-point motion vectors (i.e., $v_0$ and $v_1$). The transformed block is a rectangular block. The motion vector field of each point in this moving block can be described by the following equation:

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases} \quad (3)$$

or $$\begin{cases} v_x = \frac{(v_{1x} - v_{0x})}{w} x - \frac{(v_{2x} - v_{0x})}{h} y + v_{0x} \\ v_y = \frac{(v_{1y} - v_{0y})}{w} x + \frac{(v_{2y} - v_{0y})}{h} y + v_{0y} \end{cases} \quad (4)$$

In the above equations, ($v_{0x}$, $v_{0y}$) is the control point motion vector (i.e., $v_0$) at the upper-left corner of the block, and ($v_{1x}$, $v_{1y}$) is another control point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used. An example of motion vectors for a current block can be determined for each 4×4 sub-block based on the MVs of the two control points according to equation (3).

Figure 6:
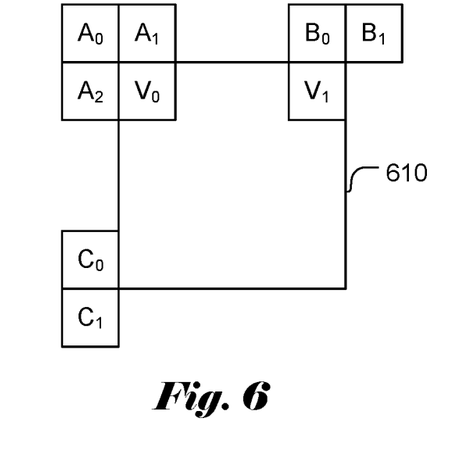
FIG. 6 illustrates an example of inherited affine candidate derivation, where the current block inherits the affine model of a neighboring block by inheriting the control-point MVs of the neighboring block as the control-point MVs of the current block.

In contribution ITU-T13-SG16-C1016, for an Inter mode coded CU, an affine flag is signaled to indicate whether the affine Inter mode is applied or not when the CU size is equal to or larger than 16×16. If the current block (e.g., current CU) is coded in affine Inter mode, a candidate MVP pair list is built using the neighbor valid reconstructed blocks. FIG. 6 illustrates the neighboring block set used for deriving the corner derived affine candidate. As shown in FIG. 6, the $\vec{v}_0$ corresponds to motion vector of the block V0 at the upper-left corner of the current block 610, which is selected from the motion vectors of the neighboring block $A_0$ (referred as the above-left block), $A_1$ (referred as the inner above-left block) and $A_2$ (referred as the lower above-left block), and the $\vec{v}_1$ corresponds to motion vector of the block V1 at the upper-right corner of the current block 610, which is selected from the motion vectors of the neighboring block $B_0$ (referred as the above block) and $B_1$ (referred as the above-right block).

Figure 7:
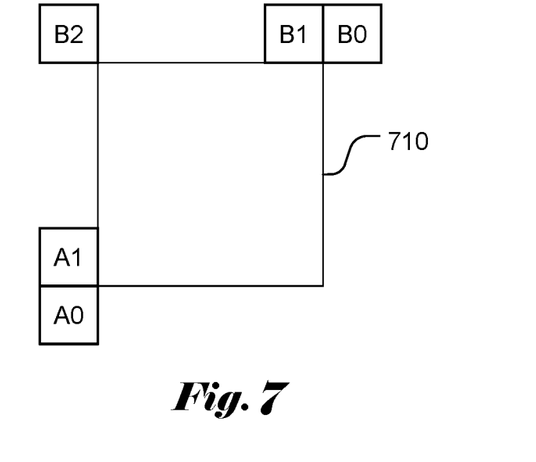
FIG. 7 illustrates an example of constructed affine candidate derivation where the neighboring blocks (A0, A1, B0, B1, and B2) are used to construct the control point MVs for affine motion model.

In contribution ITU-T13-SG16-C1016, an affine Merge mode is also proposed. If the current block 710 is a Merge coded PU, the neighboring five blocks (A0, A1, B0, B1 and B2 blocks in FIG. 7) are checked to determine whether any of them is coded in affine Inter mode or affine Merge mode. If yes, an affine_flag is signaled to indicate whether the current PU is affine mode. When the current PU is applied in affine merge mode, it gets the first block coded with affine mode from the valid neighbor reconstructed blocks. The selection order for the candidate block is from left block (A1), above block (B1), above-right block (B0), left-bottom block (A0) to above-left block (B2). In other words, the search order is A1→B1→B0→A0→B2 as shown in FIG. 7. The affine parameters of the affine coded blocks are used to derive the $v_0$ and $v_1$ for the current PU. In the example of FIG. 7, the neighboring blocks (A0, A1, B0, B1, and B2) used to construct the control point MVs for affine motion model are referred as a neighboring block set in this disclosure.

In affine motion compensation (MC), the current block is divided into multiple 4×4 sub-blocks. For each sub-block, the center point (2, 2) is used to derive a MV by using equation (3) for this sub-block. For the MC of this current, each sub-block performs a 4×4 sub-block translational MC.

In HEVC, the decoded MVs of each PU are down-sampled with a 16:1 ratio and stored in the temporal MV buffer for the MVP derivation of the following frames. For a 16×16 block, only the top-left 4×4 MV is stored in the temporal MV buffer and the stored MV represents the MV of the whole 16×16 Block.

Bi-Directional Optical Flow (BIO)

Figure 8:
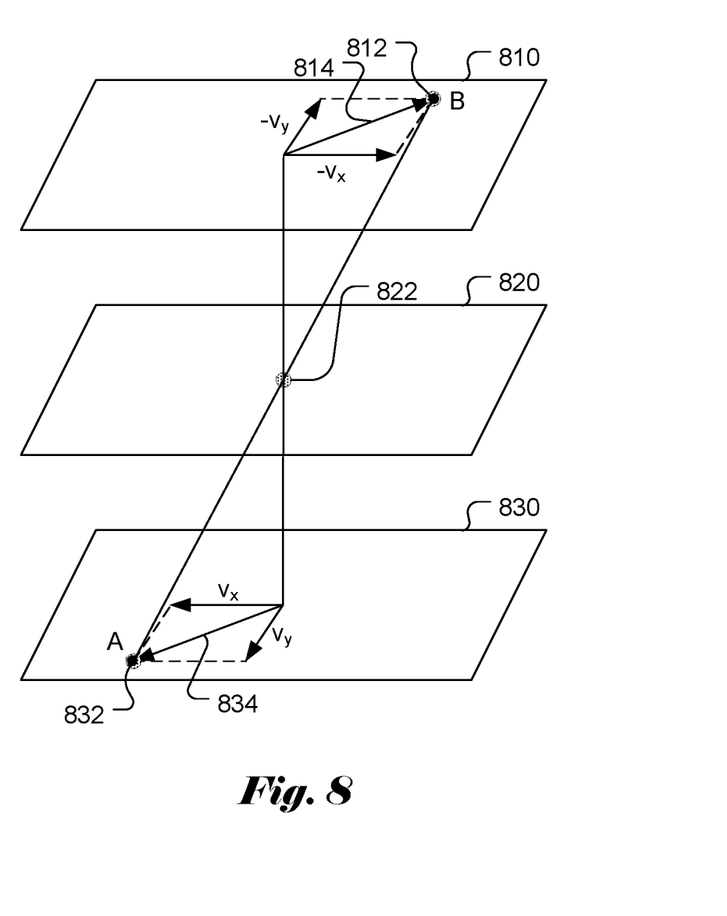
FIG. 8 illustrates an example of Bi-directional Optical Flow (BIO) derived sample-level motion refinement based on the assumptions of optical flow and steady motion.

Bi-directional optical flow (BIO) is a motion estimation/compensation technique disclosed in JCTVC-C204 (E. Alshina, et al., *Bi-directional optical flow*, Joint Collaborative Team on Video Coding (JCT-VC) of ITU-T SG 16 WP 3 and ISO/IEC JTC 1/SC 29/WG 11, 3rd Meeting: Guangzhou, CN, 7-15 Oct. 2010, Document: JCTVC-C204) and VCEG-AZ05 (E. Alshina, et al., *Known tools performance investigation for next generation video coding*, ITU-T SG 16 Question 6, Video Coding Experts Group (VCEG), 52nd Meeting: 19-26 Jun. 2015, Warsaw, Poland, Document: VCEG-AZ05). BIO derives the sample-level motion refinement based on the assumptions of optical flow and steady motion as shown in FIG. 8, where a current pixel 822 in a B-slice (bi-prediction slice) 820 is predicted by one pixel in reference picture 0 (830) and one pixel in reference picture 1 (810). As shown in FIG. 8, the current pixel 822 is predicted by pixel B (812) in reference picture 1 (810) and pixel A (832) in reference picture 0 (830). In FIG. 8, $v_x$ and $v_y$ are pixel displacement vector in the x-direction and y-direction, which are derived using a bi-direction optical flow (BIO) model. It is applied only for truly bi-directional predicted blocks, which is predicted from two reference pictures corresponding to the previous picture and the latter picture. In VCEG-AZ05, BIO utilizes a 5×5 window to derive the motion refinement of each sample. Therefore, for an N×N block, the motion compensated results and corresponding gradient information of an (N+4)×(N+4) block are required to derive the sample-based motion refinement for the N×N block. According to VCEG-AZ05, a 6-Tap gradient filter and a 6-Tap interpolation filter are used to generate the gradient information for BIO. Therefore, the computational complexity of BIO is much higher than that of traditional bi-directional prediction. In order to further improve the performance of BIO, the following methods are proposed.

In a conventional bi-prediction in HEVC, the predictor is generated using the following equation, where $P^{(0)}$ and $P^{(1)}$ are the list0 and list1 predictor, respectively.

$$P_{Conventional}[i, j]=(P^{(0)}[i, j]+P^{(1)}[i, j]+1)\gg 1$$

In JCTVC-C204 and VECG-AZ05, the BIO predictor is generated using the following equation:

$$P_{OpticalFlow}=(P^{(0)}[i, j]+P^{(1)}[i, j]+v_x[i, j](I_x^{(0)}-I_x^{(1)}[i, j])+v_y[i, j](I_y^{(0)}-I_y^{(1)}[i, j])+1)\gg 1$$

In the above equation, $I_x^{(0)}$ and $I_x^{(1)}$ represent the x-directional gradient in list0 and list1 predictor, respectively; $I_y^{(0)}$ and $I_y^{(1)}$ represent the y-directional gradient in list0 and list1 predictor, respectively; $v_x$ and $v_y$ represent the offsets or displacements in x- and y-direction, respectively. The derivation process of $v_x$ and $v_y$ is shown in the following. First, the cost function is defined as diffCost(x, y) to find the best values $v_x$ and $v_y$. In order to find the best values $v_x$ and $v_y$ to minimize the cost function, diffCost(x, y), one 5×5 window is used. The solutions of $v_x$ and $v_y$ can be represented by using $S_1$, $S_2$, $S_3$, $S_5$, and $S_6$.

$$diffCost(x, y) = \sum_\Omega \left(P^0(x, y) + v_x \frac{\partial P^0(x, y)}{\partial x} + v_y \frac{\partial P^0(x, y)}{\partial y} - \left(P^1(x, y) - v_x \frac{\partial P^1(x, y)}{\partial x} - v_y \frac{\partial P^1(x, y)}{\partial y}\right)\right)^2,$$

$$= \sum_\Omega \left(P^0(x, y) - P^1(x, y) + v_x\left(\frac{\partial P^0(x, y)}{\partial x} + \frac{\partial P^1(x, y)}{\partial x}\right) + v_y\left(\frac{\partial P^0(x, y)}{\partial y} + \frac{\partial P^1(x, y)}{\partial y}\right)\right)^2$$

The minimum cost function, min diffCost(x, y) can be derived according to:

$$\frac{\partial diffCost(x, y)}{\partial v_x} = 0,$$

$$\frac{\partial diffCost(x, y)}{\partial v_y} = 0.$$

By solving equations (3) and (4), $v_x$ and $v_y$ can be solved according to the following equation:

$$v_x = \frac{S_3 S_5 - S_2 S_6}{S_1 S_5 - S_2 S_2},$$

$$v_y = \frac{S_1 S_6 - S_3 S_2}{S_1 S_5 - S_2 S_2}$$

where, $$S_1 = \sum_\Omega \left(\frac{\partial P^0(x, y)}{\partial x} + \frac{\partial P^1(x, y)}{\partial x}\right)^2,$$

$$S_2 = \sum_\Omega \left(\frac{\partial P^0(x, y)}{\partial x} + \frac{\partial P^1(x, y)}{\partial x}\right)\left(\frac{\partial P^0(x, y)}{\partial y} + \frac{\partial P^1(x, y)}{\partial y}\right)$$

$$S_3 = -\sum_\Omega \left(\frac{\partial P^0(x, y)}{\partial x} + \frac{\partial P^1(x, y)}{\partial x}\right)(P^0(x, y) - P^1(x, y)),$$

$$S_5 = \sum_\Omega \left(\frac{\partial P^0(x, y)}{\partial y} + \frac{\partial P^1(x, y)}{\partial y}\right)^2$$

$$S_6 = -\sum_\Omega \left(\frac{\partial P^0(x, y)}{\partial y} + \frac{\partial P^1(x, y)}{\partial y}\right)(P^0(x, y) - P^1(x, y)).$$

In the above equations, $$\frac{\partial P^0(x, y)}{\partial x}$$

corresponds to the x-direction gradient of a pixel at (x, y) in the list 0 picture, $$\frac{\partial P^1(x, y)}{\partial x}$$

corresponds to the x-direction gradient of a pixel at (x, y) in the list 1 picture, $$\frac{\partial P^0(x, y)}{\partial y}$$

corresponds to the y-direction gradient of a pixel at (x, y) in the list 0 picture, and $$\frac{\partial P^1(x, y)}{\partial y}$$

corresponds to the y-direction gradient of a pixel at (x, y) in the list 1 picture.

In some related art, the $S_2$ can be ignored, and $v_x$ and $v_y$ can be solved according to $$v_x = \frac{S_3}{S_1},$$

$$v_y = \frac{S_6 - v_x S_2}{S_5}$$

where, $$S_1 = \sum_\Omega \left(\frac{\partial P^0(x, y)}{\partial x} + \frac{\partial P^1(x, y)}{\partial x}\right)^2,$$

$$S_2 = \sum_\Omega \left(\frac{\partial P^0(x, y)}{\partial x} + \frac{\partial P^1(x, y)}{\partial x}\right)\left(\frac{\partial P^0(x, y)}{\partial y} + \frac{\partial P^1(x, y)}{\partial y}\right)$$

$$S_3 = -\sum_\Omega \left(\frac{\partial P^0(x, y)}{\partial x} + \frac{\partial P^1(x, y)}{\partial x}\right)(P^0(x, y) - P^1(x, y)),$$

$$S_5 = \sum_\Omega \left(\frac{\partial P^0(x, y)}{\partial y} + \frac{\partial P^1(x, y)}{\partial y}\right)^2$$

$$S_6 = -\sum_\Omega \left(\frac{\partial P^0(x, y)}{\partial y} + \frac{\partial P^1(x, y)}{\partial y}\right)(P^0(x, y) - P^1(x, y))$$

We can find that the required bit-depth is large in BIO process, especially for calculating $S_1$, $S_2$, $S_3$, $S_5$, and $S_6$. For example, if the bit-depth of pixel value in video sequences is 10 bits and the bit-depth of gradients is increased by fractional interpolation filter or gradient filter, then 16 bits are required to represent one x-directional gradient or one y-directional gradient. These 16 bits may be further reduced by gradient shift equal to 4, so one gradient needs 12 bits to represent the value. Even if the magnitude of gradient can be reduced to 12 bits by gradient shift, the required bit-depth of BIO operations is still large. One multiplier with 13 bits by 13 bits is required to calculate $S_1$, $S_2$, and $S_5$. And another multiplier with 13 bits by 17 bits is required to get $S_3$, and $S_6$. When the window size is large, more than 32 bits are required to represent $S_1$, $S_2$, $S_3$, $S_5$, and $S_6$.

Recently, a new tool named non-adjacent affine candidates has also been proposed for the emerging video coding standard. However, this new tool requires to store motion information for neighboring blocks in a large area. The present invention discloses techniques to reduce the storage requirement.

BRIEF SUMMARY OF THE INVENTION

Methods and apparatus of video coding using an affine mode are disclosed. According to this method, input data associated with a current block are received, wherein the input data comprise pixel data for the current block to be encoded at an encoder side or coded data associated with the current block to be decoded at a decoder side. One or more neighboring MVs (motion vectors) are determined from one or more non-adjacent affine-coded neighbors of the current block. CPMVs (Control-Point Motion Vectors) are determined based on said one or more neighboring MVs, wherein if a target neighboring block associated with one target neighboring MV (Motion Vector) is outside an available region, a derived CPMV (Control-Point Motion Vector) is generated to replace the target neighboring MV. An affine merge list or an affine AMVP (Advanced Motion Vector Prediction) list comprising said one or more neighboring MVs as one non-adjacent affine candidate is generated, wherein said one non-adjacent affine candidate generates a non-adjacent affine predictor using motion information according to the CPMVs. The current block is encoded or decoded using a motion candidate selected from the affine merge list or the affine AMVP.

In one embodiment, the available region corresponds to a current CTU enclosing the current block, left K decoded CTUs of the current block, above L decoded CTUs of the current block, or a combination thereof, and wherein K and L are positive integers.

In one embodiment, the derived CPMV corresponds to a nearest CPMV, to the current block, in the available region. In another embodiment, the derived CPMV corresponds to one or more pre-defined CPMVs. In yet another embodiment, the derived CPMV is derived according to a pre-defined method. In yet another embodiment, the derived CPMV is derived according to a stored 4×4 or N×N sub-block MV, and wherein N is a positive integer.

In one embodiment, the CPMVs correspond to inherited MVs based on said one or more neighboring MVs. In another embodiment, the CPMVs correspond to constructed MVs derived from said one or more neighboring MVs.

In one embodiment, the CPMVs correspond to constructed MVs or inherited MVs based on said one or more neighboring MVs. In one embodiment, the available region is the same for the constructed MVs and the inherited MVs.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Affine with Non-Adjacent Candidates

Figure 9A:
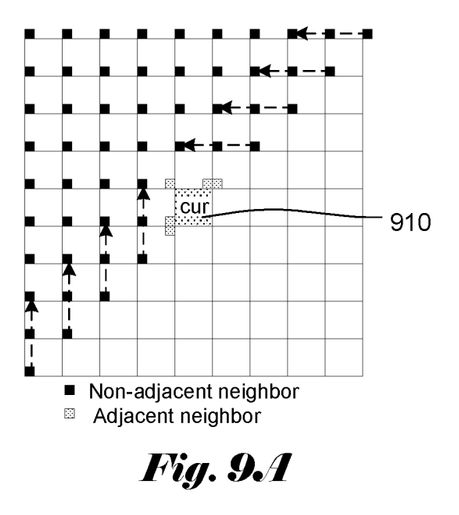
FIGS. 9A-B illustrate examples of non-adjacent spatial neighbors for deriving affine merge mode (NSAM), where the pattern of obtaining non-adjacent spatial neighbors is shown in FIG. 9A for deriving inherited affine merge candidates and in FIG. 9B for deriving constructed affine merge candidates.
Figure 9B:
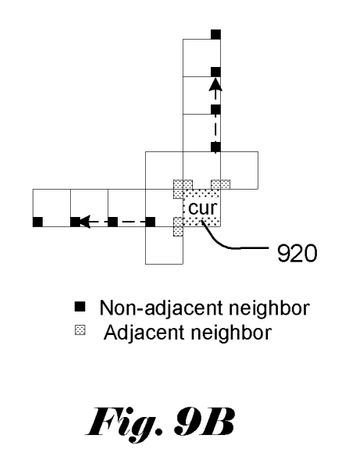

In JVET-Y0153 (Wei Chen, et al., "EE2-3.11: Non-adjacent spatial neighbors for affine merge mode", Joint Video Experts Team (JVET) of ITU-T SG 16 WP 3 and ISO/IEC JTC 1/SC 29/WG 11, 25th Meeting, by teleconference, 12-21 Jan. 2022, Document: JVET-Y0153), a technology of using non-adjacent spatial neighbors for affine merge and AMVP modes are proposed. In non-adjacent spatial neighbors for affine merge mode (NSAM), the pattern of obtaining non-adjacent spatial neighbors is shown in FIGS. 9A-B, where FIG. 9A is for deriving inherited affine merge candidates and FIG. 9B is for deriving constructed affine merge candidates. Same as the existing non-adjacent regular merge candidates disclosed in JVET-X2025 (Fabrice Le Léannec, et al., "Algorithm description of Enhanced Compression Model 3 (ECM 3)", Joint Video Experts Team (WET) of ITU-T SG 16 WP 3 and ISO/IEC JTC 1/SC 29/WG 11, 24th Meeting, by teleconference, 6-15 Oct. 2021, Document: JVET-X2025), the distances between non-adjacent spatial neighbors and the current coding block in the NSAM are also defined based on the width and height of current CU.

Figure 10:
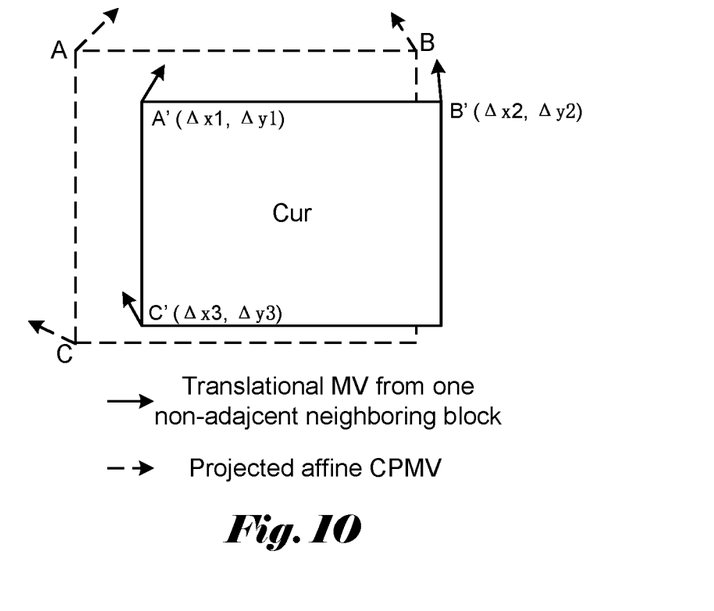
FIG. 10 illustrates an example of constructed affine candidates according to non-adjacent neighbors, where the motion information of the three non-adjacent neighbors at locations A, B and C is used to form the CPMVs.

The motion information of the non-adjacent spatial neighbors in FIGS. 9A-B is utilized to generate additional inherited and/or constructed affine merge candidates for the current CU (block 910 in FIG. 9A and block 920 in FIG. 9B). Specifically, for inherited candidates, the same derivation process of the inherited affine merge candidates in the VVC is kept unchanged except that the CPMVs are inherited from non-adjacent spatial neighbors. In other words, the CPMVs may correspond to inherited MVs based on one or more non-adjacent neighboring MVs in one example or constructed MVs derived from one or more non-adjacent neighboring MVs in another example. In yet another example, the CPMVs may correspond to inherited MVs based on one or more non-adjacent neighboring MVs or constructed MVs derived from one or more non-adjacent neighboring MVs. The non-adjacent spatial neighbors are checked based on their distances to the current block from near neighbors to far neighbors. At a specific distance, only the first available neighbor (i.e., one coded with the affine mode) from each side (e.g., the left and above) of the current block is included for inherited candidate derivation. As indicated by the dash arrows in FIG. 9A, the checking orders of the neighbors on the left and above sides are bottom-to-up and right-to-left, respectively. For constructed candidates (namely "the first type of constructed affine candidates from non-adjacent neighbors"), as shown in the FIG. 9B, the positions of one left and one above non-adjacent spatial neighbors are firstly determined independently. After that, the location of the top-left neighbor can be determined accordingly which can enclose a rectangular virtual block together with the left and above non-adjacent neighbors. Then, as shown in the FIG. 10, the motion information of the three non-adjacent neighbors at locations A, B and C is used to form the CPMVs at the top-left (A), top-right (B) and bottom-left (C) of the virtual block, which is finally projected to the current CU to generate the corresponding constructed candidates.

In JVET-Y0153, it is required to store a lot of CPMVs of the neighboring CTUs. To reduce buffer requirement for data access, it is proposed to constrain the available region of non-adjacent spatial neighboring blocks. If the neighboring block associated with the CPMV is outside of the available region, the CPMV is treated as not available or will be replaced by a derived CPMV, where the derived CPMV can be the nearest CPMV around the available region, one or more predefined CPMV, one or more CPMV derived by a pre-defined method, or a stored 4×4 or N×N sub-block MV. In this disclosure, when the neighboring block associated with the CPMV is outside of the available region, we may refer to this case as "the CPMV is outside the available region" for simplicity. In one embodiment, the region is within current CTU. In this case, only if the to-be used non-adjacent spatial neighboring block is within the same CTU as current block, it can be inserted into the affine merge list or affine AMVP list, or any CPMV candidate list. In another embodiment, the region can be current CTU and left K decoded CTUs. In another embodiment, the region can be current CTU, left K decoded CTUs and above L decoded CTUs. In another embodiment, the region can be N CTU rows. In another embodiment, the region can be a region with multiple of CTUs. In another embodiment, the region can be current CTU, left K decoded CTUs and above L decoded CTUs, above-left M decoded CTUs, and above-right P decoded CTUs. K, L, M, N, and P can be any integer greater than zero. In another embodiment, the available region can be adaptively determined by a method that involve the current CU location.

The pre-defined available region can be defined according to the processing unit. In one embodiment, the available region of non-adjacent spatial neighboring block used for inherited affine merge candidates (i.e., inherited MVs) based on one or more non-adjacent neighboring MVs and constructed affine merge candidates (i.e., constructed MVs) derived from one or more non-adjacent neighboring MVs shall be the same.

In one embodiment, if the to-be-used non-adjacent spatial neighboring block is invalid (i.e. outside a pre-defined region), a default motion vector can be applied. For example, the default motion vector can be derived from the top-left corner block of the valid region, the most left block or the most top block of the valid region, or directly use the translation motion vectors.

The constraint can be also extended to the non-adjacent neighboring candidates used in regular merge, MMVD, AMVP, IBC or any other tools tried to reference non-adjacent spatial neighboring candidates.

In one embodiment, for a temporal collocated motion vector, an available region can be pre-defined. If a to-be referenced temporal collocated motion vector is outside that region, it should not be referenced. In one embodiment, the region can be the current CTU, N decoded CTUs, or M decoded CTU rows. M, and N can be any integer greater than zero. The available region used for the temporal collocated motion vector can be different from the available region used for non-adjacent spatial neighboring candidates.

Any of the foregoing proposed methods can be implemented in encoders and/or decoders. For example, any of the proposed methods can be implemented in an affine inter prediction module (e.g. Inter Pred. 112 in FIG. 1A or MC 152 in FIG. 1B) of an encoder and/or a decoder. Alternatively, any of the proposed methods can be implemented as a circuit coupled to affine inter prediction module of the encoder and/or the decoder.

Figure 11:
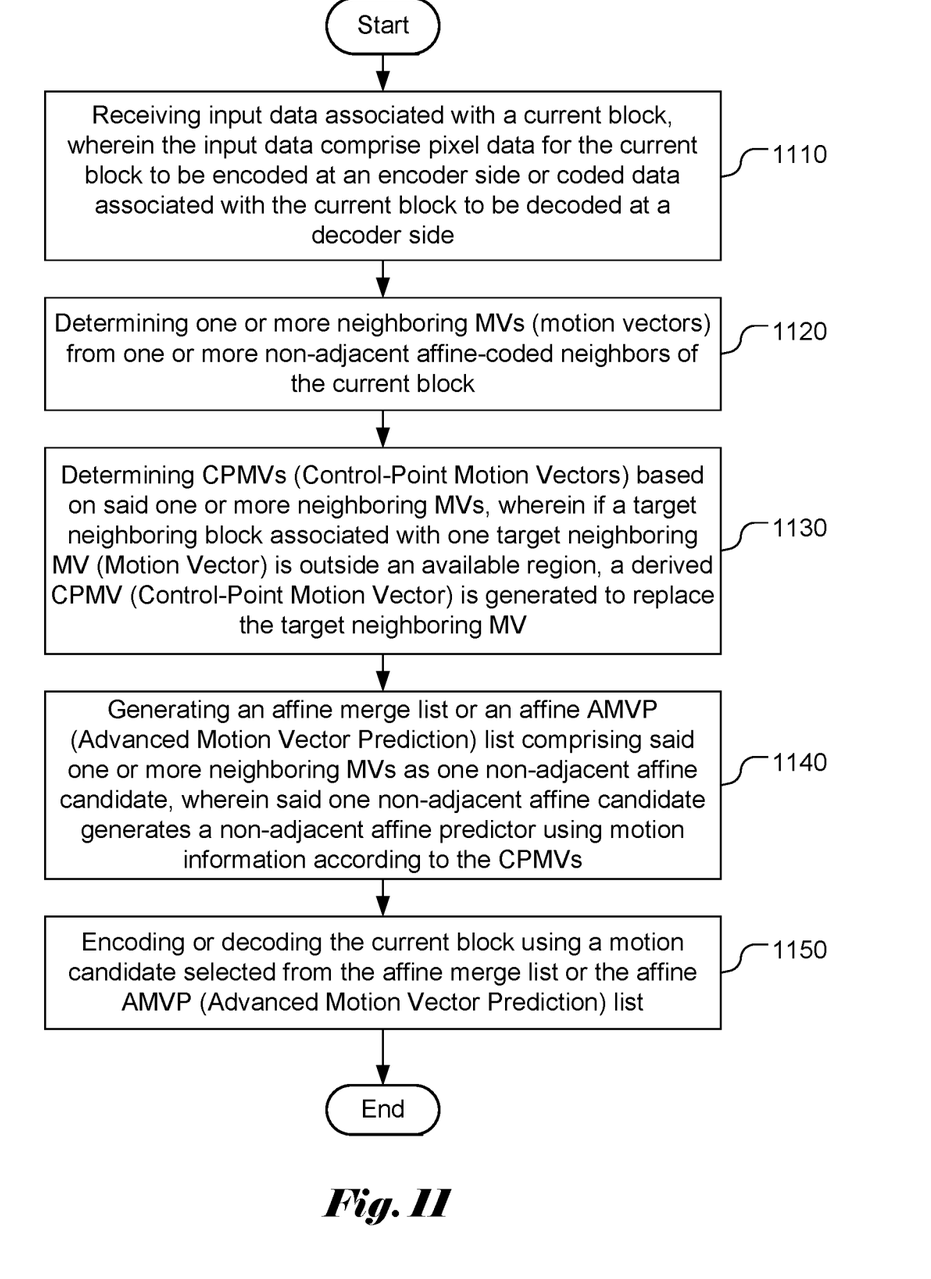
FIG. 11 illustrates an exemplary flowchart for a video coding system utilizing non-adjacent affine candidates according to an embodiment of the present invention.

FIG. 11 illustrates an exemplary flowchart for a video coding system utilizing non-adjacent affine candidates according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current block are received in step 1110, wherein the input data comprise pixel data for the current block to be encoded at an encoder side or coded data associated with the current block to be decoded at a decoder side. One or more neighboring MVs (motion vectors) are determined from one or more non-adjacent affine-coded neighbors of the current block in step 1120. CPMVs (Control-Point Motion Vectors) are determined based on said one or more neighboring MVs in step 1130, wherein if a target neighboring block associated with one target neighboring MV (Motion Vector) is outside an available region, a derived CPMV (Control-Point Motion Vector) is generated to replace the target neighboring MV. An affine merge list or an affine AMVP (Advanced Motion Vector Prediction) list comprising said one or more neighboring MVs as one non-adjacent affine candidate is generated in step 1140, wherein said one non-adjacent affine candidate generates a non-adjacent affine predictor using motion information according to the CPMVs. The current block is encoded or decoded using a motion candidate selected from the affine merge list or the affine AMVP (Advanced Motion Vector Prediction) list in step 1150.

The flowchart shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
receiving input data associated with a current block, wherein the input data comprise pixel data for the current block to be encoded at an encoder side or coded data associated with the current block to be decoded at a decoder side;
determining one or more neighboring MVs (Motion Vectors) from one or more non-adjacent affine-coded neighbors of the current block;
determining CPMVs (Control-Point Motion Vectors) based on said one or more neighboring MVs, wherein if a target neighboring block associated with one target neighboring MV (Motion Vector) is outside an available region, a derived CPMV (Control-Point Motion Vector) is generated to replace the target neighboring MV;
generating an affine merge list or an affine AMVP (Advanced Motion Vector Prediction) list comprising said one or more neighboring MVs as one non-adjacent affine candidate, wherein said one non-adjacent affine candidate generates a non-adjacent affine predictor using motion information according to the CPMVs; and
encoding or decoding the current block using a motion candidate selected from the affine merge list or the affine AMVP list.

2. The method of claim 1, wherein the available region corresponds to a current CTU enclosing the current block, left K decoded CTUs of the current block, above L decoded CTUs of the current block, or a combination thereof, and wherein K and L are positive integers.

3. The method of claim 1, wherein the derived CPMV corresponds to a nearest CPMV, to the current block, in the available region.

4. The method of claim 1, wherein the derived CPMV corresponds to one or more pre-defined CPMVs.

5. The method of claim 1, wherein the derived CPMV is derived according to a pre-defined method.

6. The method of claim 1, wherein the derived CPMV is derived according to a stored 4×4 or N×N sub-block MV, and wherein N is a positive integer.

7. The method of claim 1, wherein the CPMVs correspond to inherited MVs based on said one or more neighboring MVs.

8. The method of claim 1, wherein the CPMVs correspond to constructed MVs derived from said one or more neighboring MVs.

9. The method of claim 1, wherein the CPMVs correspond to constructed MVs derived from said one or more neighboring MVs or inherited MVs based on said one or more neighboring MVs.

10. The method of claim 9, wherein the available region is the same for the constructed MVs and the inherited MVs.

11. An apparatus for video coding, the apparatus comprising one or more electronic circuits or processors arranged to:
- receive input data associated with a current block, wherein the input data comprise pixel data for the current block to be encoded at an encoder side or coded data associated with the current block to be decoded at a decoder side;
- determine one or more neighboring MVs (Motion Vectors) from one or more non-adjacent affine-coded neighbors of the current block;
- determine CPMVs (Control-Point Motion Vectors) based on said one or more neighboring MVs, wherein if a target neighboring block associated with one target neighboring MV (Motion Vector) is outside an available region, a derived CPMV (Control-Point Motion Vector) is generated to replace the target neighboring MV;
- generate an affine merge list or an affine AMVP (Advanced Motion Vector Prediction) list comprising said one or more neighboring MVs as one non-adjacent affine candidate, wherein said one non-adjacent affine candidate generates a non-adjacent affine predictor using motion information according to the CPMVs; and
- encode or decode the current block using a motion candidate selected from the affine merge list or the affine AMVP.

12. A method of video coding, the method comprising:
- receiving input data associated with a current block, wherein the input data comprise pixel data for the current block to be encoded at an encoder side or coded data associated with the current block to be decoded at a decoder side;
- determining one or more neighboring MVs (Motion Vectors) from one or more non-adjacent affine-coded neighbors of the current block;
- determining CPMVs (Control-Point Motion Vectors) based on said one or more neighboring MVs, wherein if a target neighboring block associated with one target neighboring MV (Motion Vector) is outside an available region, a derived CPMV (Control-Point Motion Vector) is generated to replace the target neighboring MV;
- generating a motion candidate list comprising said one or more neighboring MVs as one non-adjacent affine candidate, wherein said one non-adjacent affine candidate generates a non-adjacent affine predictor using motion information according to the CPMVs; and
- encoding or decoding the current block using a motion candidate selected from the motion candidate list.

13. The method of claim 12, wherein the motion candidate list corresponds to regular merge candidate list, MMVD, AMVP (Advanced Motion Vector Prediction) list, or IBC (Intra-Block Copy).

* * * * *